(12) United States Patent
Ghosh et al.

(10) Patent No.: US 10,936,309 B2
(45) Date of Patent: Mar. 2, 2021

(54) DEVELOPMENT PROJECT BLUEPRINT AND PACKAGE GENERATION

(71) Applicant: Accenture Global Solutions Limited, Dublin (IE)

(72) Inventors: Bhaskar Ghosh, Bengaluru (IN); Mohan Sekhar, Bangalore (IN); Rajendra T. Prasad, Bangalore (IN); Koushik M. Vijayaraghavan, Chennai (IN); Arpan Shukla, Coppell, TX (US); Chandrashekhar Arun Deshpande, Thane (IN); Mahesh Rajappan, Bangalore (IN); Muthukumar Rengaraju, Chennai (IN)

(73) Assignee: Accenture Global Solutions Limited, Dublin (IE)

( * ) Notice: Subject to any disclaimer, the term of this patent is extended or adjusted under 35 U.S.C. 154(b) by 23 days.

(21) Appl. No.: 16/374,274

(22) Filed: Apr. 3, 2019

(65) Prior Publication Data

US 2020/0319879 A1    Oct. 8, 2020

(51) Int. Cl.
*G06F 9/44* (2018.01)
*G06F 8/77* (2018.01)
*G06F 8/20* (2018.01)

(52) U.S. Cl.
CPC ............... *G06F 8/77* (2013.01); *G06F 8/20* (2013.01)

(58) Field of Classification Search
CPC ..................................... G06F 8/20; G06F 8/77
USPC .................................................. 717/100–109
See application file for complete search history.

(56) References Cited

U.S. PATENT DOCUMENTS

| | | | | |
|---|---|---|---|---|
| 8,494,894 B2* | 7/2013 | Jaster | ................... | G06Q 30/02 705/7.29 |
| 9,043,747 B2* | 5/2015 | Eksten | ................... | G06F 9/5066 717/105 |
| 10,324,690 B2* | 6/2019 | Ouali | ................... | G06F 8/10 |
| 2015/0169299 A1* | 6/2015 | Sharma | ................... | G06F 8/61 717/104 |
| 2015/0370607 A1* | 12/2015 | Hodge | ................... | G06F 9/45558 718/1 |
| 2019/0340037 A1* | 11/2019 | Hodge | ................... | G06F 9/5077 |

OTHER PUBLICATIONS

Steve Buchanan, "Architect Your Cloud with Azure Blueprints", 2018, Microsoft MVP, Whitepaper, 18 pages. (Year: 2018).*
Chua Hock-Chuan, "Python—Developing Web Applications with Flask", 2017, retrieved from https://www3.ntu.edu.sg/home/ehchua/programming/webprogramming/Python3_Flask.html, 74 pages. (Year: 2017).*
Blueprint, "Blueprint 7.3—User Guide", 2016, Blueprint Software Systems Inc., 212 pages. (Year: 2016).*

* cited by examiner

Primary Examiner — Ted T. Vo
(74) Attorney, Agent, or Firm — Harrity & Harrity, LLP

(57) ABSTRACT

A device may determine a plurality of components for a development project. The device may determine a blueprint template based on the plurality of components of the development project. The device may generate a blueprint for the development project based on the blueprint template. The device may generate a package for the development project based on the blueprint for the development project. The device may provide output associated with the blueprint and the package based on generating the blueprint and generating the package.

20 Claims, 11 Drawing Sheets

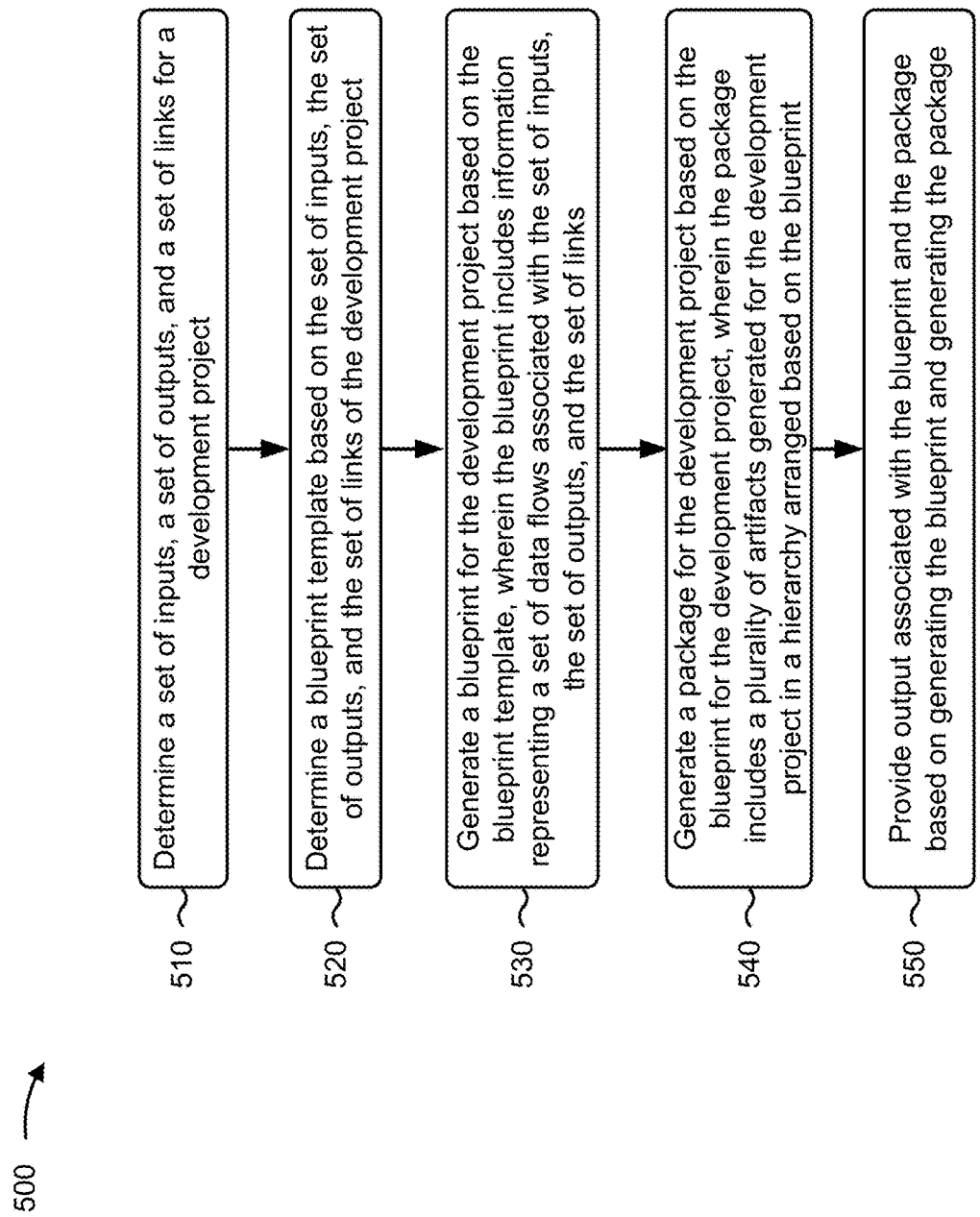

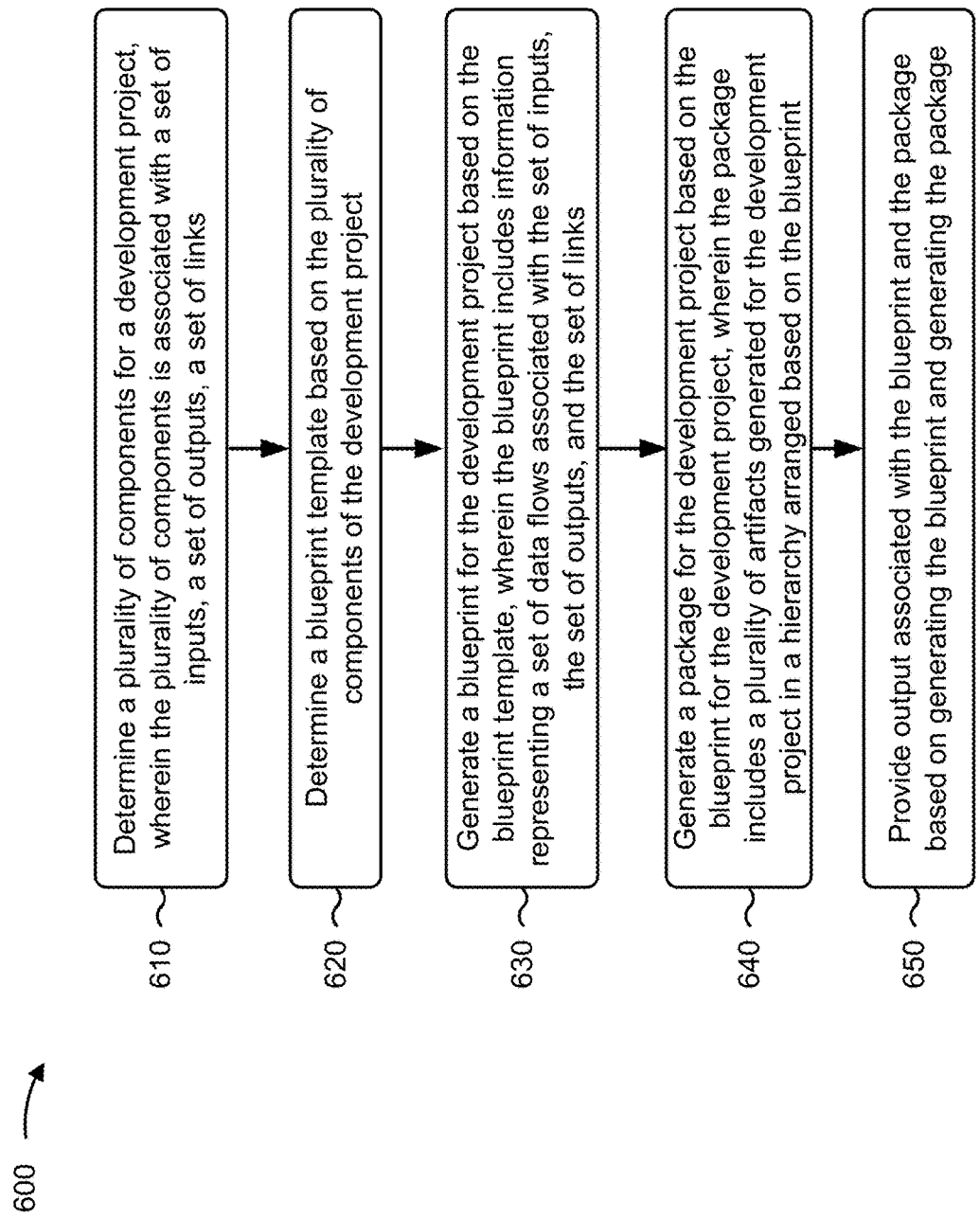

DEVELOPMENT PROJECT BLUEPRINT AND PACKAGE GENERATION

BACKGROUND

A software platform may provide access to many different tools from many different developers. When establishing a particular development project in the software platform, a user may select one or more tools from a tool catalogue for integration into the particular development project. Each tool may be associated with different inputs, outputs, application programming interfaces (APIs), data formats, and/or the like. Integration of a particular tool into a particular development project may be a resource-intensive process that includes mapping functionalities between the particular tool and other tools; establishing files, folders, packages, dependencies, etc.; assigning computing resources to execute the particular tool, and/or the like. Failing to accurately integrate a tool, such as by a computing environment failing to correctly set up a mapping of functionalities, failing to create a correct set of packages, failing to assign a correct amount of computing resources, and/or the like may result in excess costs, excess time, and/or the like to complete the particular development project. Moreover, inaccuracies in integrating a tool may result in inefficient utilization of system memory, excess utilization of system processing resources, and/or the like.

SUMMARY

In some implementations, a method of wireless communication may include determining a plurality of components for a development project, wherein the plurality of components is associated with a set of inputs, a set of outputs, and a set of links; determining a blueprint template based on the plurality of components of the development project; generating a blueprint for the development project based on the blueprint template, wherein the blueprint includes information representing a set of data flows associated with the set of inputs, the set of outputs, and the set of links; generating a package for the development project based on the blueprint for the development project, wherein the package includes a plurality of artifacts generated for the development project in a hierarchy arranged based on the blueprint; and providing output associated with the blueprint and the package based on generating the blueprint and generating the package.

In some implementations, a device may include memory and one or more processors operatively coupled to the memory. The memory and the one or more processors may be configured to determine a set of inputs, a set of outputs, and a set of links for a development project; determine a blueprint template based on the set of inputs, the set of outputs, and the set of links of the development project; generate a blueprint for the development project based on the blueprint template, wherein the blueprint includes information representing a set of data flows associated with the set of inputs, the set of outputs, and the set of links; generate a package for the development project based on the blueprint for the development project, wherein the package includes a plurality of artifacts generated for the development project in a hierarchy arranged based on the blueprint; and provide output associated with the blueprint and the package based on generating the blueprint and generating the package.

In some implementations, a non-transitory computer-readable medium may store instructions that, when executed by one or more processors of a device, cause the one or more processors to: determine a plurality of components for a development project, wherein the plurality of components is associated with a set of inputs, a set of outputs, a set of links; determine a blueprint template based on the plurality of components of the development project; generate a blueprint for the development project based on the blueprint template, wherein the blueprint includes information representing a set of data flows associated with the set of inputs, the set of outputs, and the set of links; generate a package for the development project based on the blueprint for the development project, wherein the package includes a plurality of artifacts generated for the development project in a hierarchy arranged based on the blueprint; and provide output associated with the blueprint and the package based on generating the blueprint and generating the package.

BRIEF DESCRIPTION OF THE DRAWINGS

FIGS. 4-6 are flow charts of example processes for development project blueprint and package generation.

DETAILED DESCRIPTION

The following detailed description of example implementations refers to the accompanying drawings. The same reference numbers in different drawings may identify the same or similar elements.

A software development platform may provide access to different tools, repositories, and/or the like to manage different portions of the software development process and for integration into a software development project. The tools, repositories, and/or the like may be developed by different developers according to different standards, using different application programming interfaces (API), with different computing requirements, in different programming languages, with different data formats, and/or the like. When a computing environment is to integrate a tool into a software development project, the tool may need to have an established mapping between inputs of the tool and outputs of other tools, between outputs of the tool and inputs of the other tools, and/or the like. Moreover, the tool may require a set of established files, folders, repositories, and/or the like, and an assignment of computing resources. As quantities of available tools increases and as tool complexity increases, small errors in tool instantiation may result in significant waste of memory resources, processing resources, and/or the like. For example, when a system integrates a new tool based on existing tools of a software environment, the system may generate code, packages, and/or the like to enable the existing tools to communicate with the new tool. However, when a subsequent tool is to be integrated, the generated code, packages, and/or the like may need to be altered for the subsequent tool.

Some implementations described herein may automatically generate a functional blueprint and/or a technical blueprint for tool integration, and may automatically provision a tool based on the functional blueprint and/or technical blueprint by creating files, folders, dependencies, linkages, and/or the like. In this way, tools may be accurately integrated into a software development project based on both existing tools in a software development project and subsequent tools that are to be integrated into the software development project at a subsequent time, thereby expanding functionalities usable with the software development project. Moreover, based on reducing a likelihood of missed linkage setup, incorrect file, folder, or dependency establishment, and/or the like, some implementations described herein reduce a waste of memory resources and/or processing resources associated with altering code, refactoring code, changing dependencies, and/or the like.

FIGS. 1A-1F are diagrams of an example implementation 100 described herein. As shown in FIGS. 1A-1F, example implementation 100 includes a client device 102, a blueprinting platform 104, and an authentication system 106.

Figure 1A:
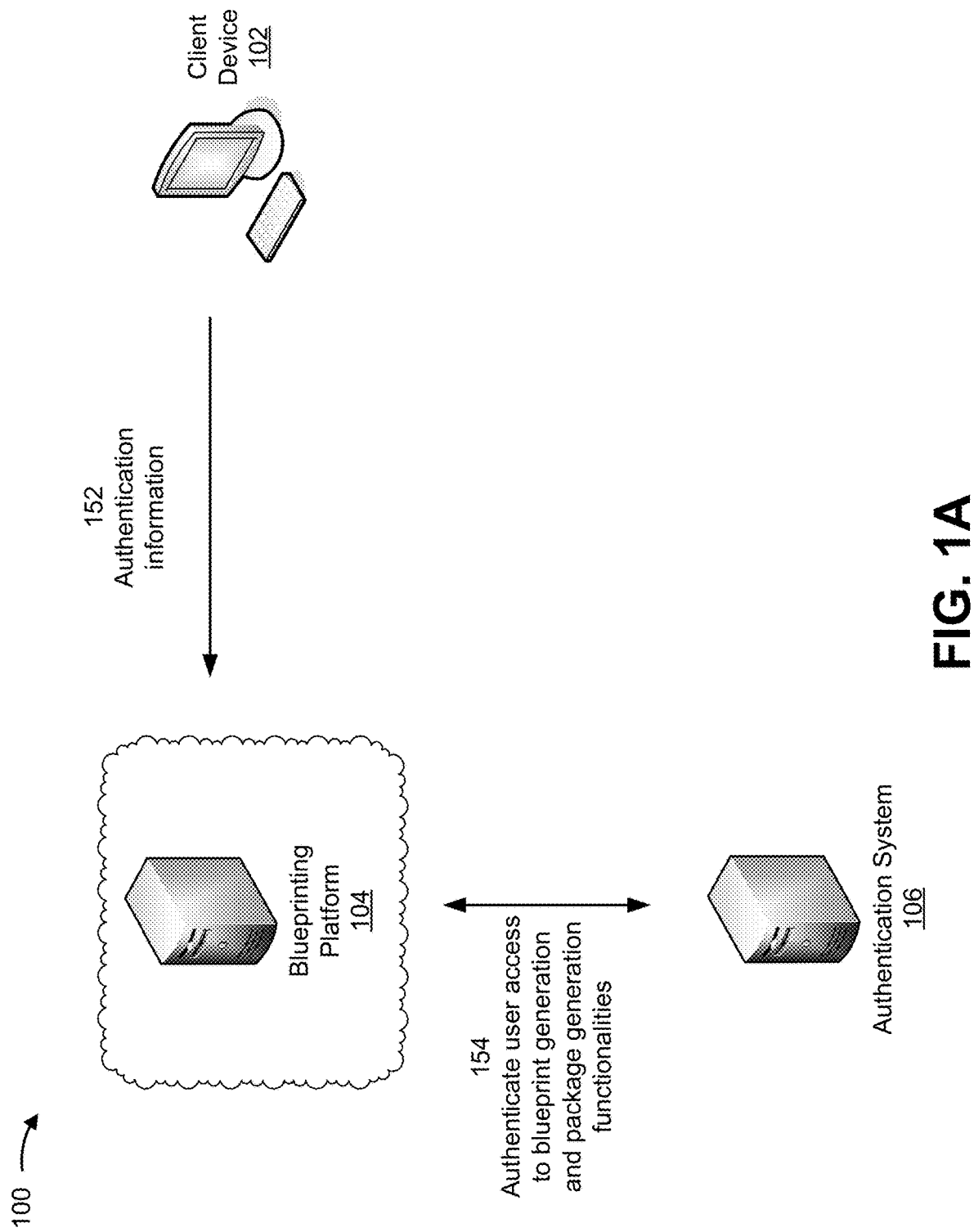
FIGS. 1A-1F are diagrams of an example implementation described herein.

As further shown in FIG. 1A, and by reference number 152, blueprinting platform 104 may obtain authentication information from client device 102. For example, blueprinting platform 104 may provide a user interface via client device 102 to receive authentication information associated with identifying an identity of a user. In this case, the authentication information may include a user name, a password, information identifying a role (e.g., whether a user is a developer, a supervisor, etc.), information identifying an experience level, and/or the like. In this way, blueprinting platform 104 may configure a user experience based on a user that is using client device 102 to access blueprinting platform 104. For example, for a first type of user associated with a first level of experience or a first role, blueprinting platform 104 may grant access to a first set of functionalities of blueprinting platform 104. In contrast, for a second type of user associated with a second, higher level of experience or a second role, blueprinting platform 104 may grant access to the first set of functionalities and a second set of functionalities of blueprinting platform 104. In some implementations, blueprinting platform 104 may enable multi-factor authentication to reduce a risk of security issues relating to unauthorized access to blueprinting platform 104.

As further shown in FIG. 1A, and by reference number 154, blueprinting platform 104 may communicate with authentication system 106 to authenticate user access to blueprint generation and package generation functionalities. For example, blueprinting platform 104 may provide authentication information to authentication system 106, and may receive information indicating that a user is authenticated for access to functionalities of blueprinting platform 104. Additionally, or alternatively, blueprinting platform 104 may communicate with authentication system 106 to obtain access to one or more other platforms. For example, blueprinting platform 104 may authenticate access to an application programming interface, a database, a data structure, and/or the like, which may be utilized in generating a blueprint, generating a package, and/or the like.

Figure 1B:
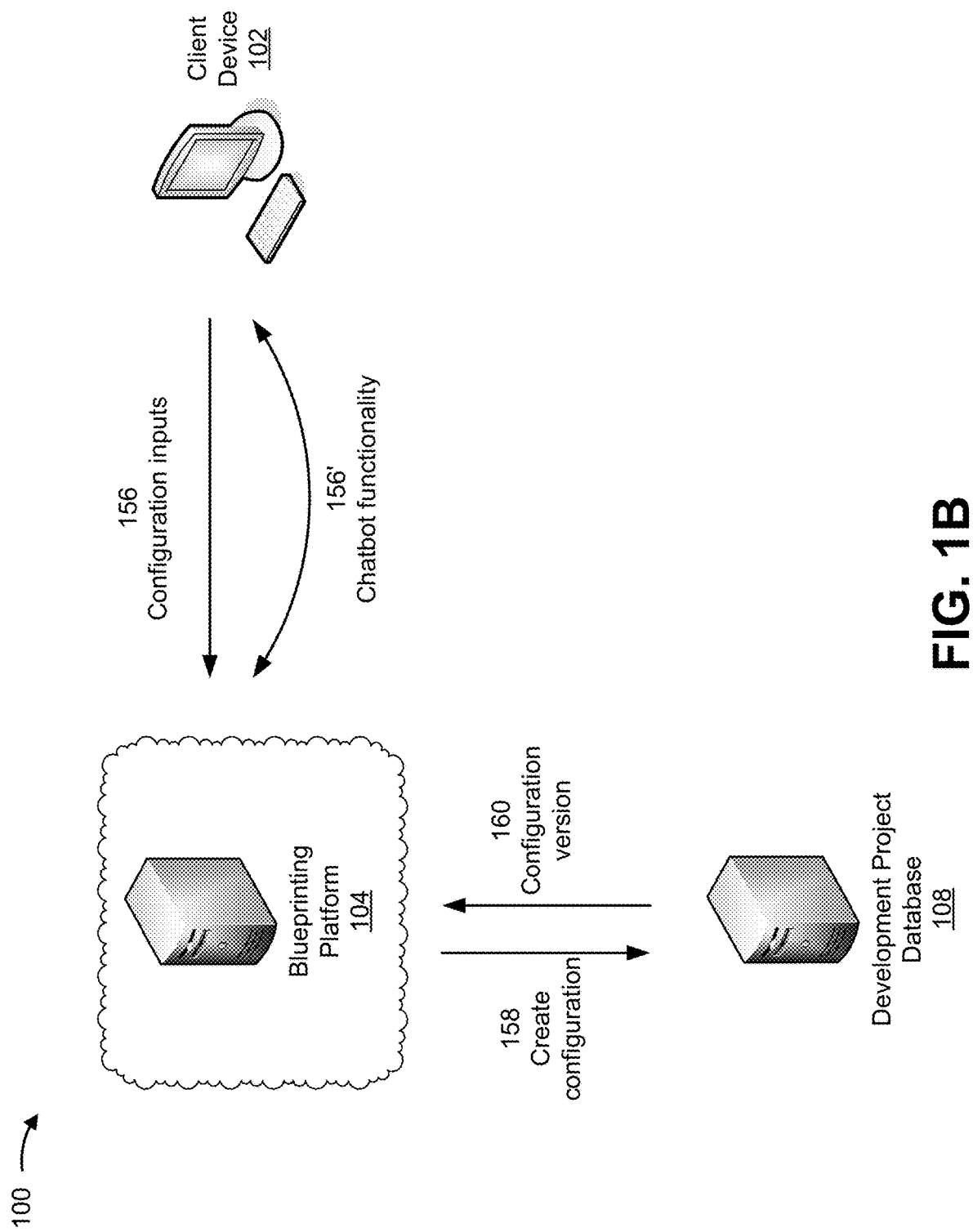

As shown in FIG. 1B, and by reference number 156, blueprinting platform 104 may receive configuration inputs associated with enabling configuration of blueprint generation. For example, blueprinting platform 104 may obtain information regarding generating of a blueprint. Blueprinting platform 104 may provide a questionnaire (e.g., via client device 102) to obtain the configuration inputs. For example, blueprinting platform 104 may access a stored questionnaire regarding development projects, and may provide a user interface with which to receive responses to questions of the questionnaire. In some implementations, blueprinting platform 104 may receive configuration inputs identifying aspects of a software development project. For example, blueprinting platform 104 may receive information identifying a type of project, a type of development process, a set of tools for integration, a set of communicating computing environments (e.g., cloud computing environments, data centers, and/or the like that host tools that are to be integrated into the software development project, etc.), a set of requirements, a set of deliverables, and/or the like.

As further shown in FIG. 1B, and by reference number 156', blueprinting platform 104 may provide a chatbot functionality to guide a user in providing information associated with the configuration inputs. For example, blueprinting platform 104 may use a natural language processing (NLP) functionality to analyze human language and provide answers, obtain information, and/or the like by communicating with a user using textual communications, audio communications (e.g., by using a text-to-speech generator and/or a speech-to-text generator), video, and/or the like. In this case, blueprinting platform 104 may process a natural language question by a user to determine an intent, a semantic meaning, and/or the like, and to detect a corresponding response in a data structure storing responses corresponding to a set of possible questions. In this case, blueprinting platform 104 may provide a natural language response, thereby reducing a technical difficulty in using blueprinting platform 104 to generate a blueprint and reducing a need to provide large help files, which may waste memory resources to store and/or network resources to transmit.

As further shown in FIG. 1B, and by reference number 158, blueprinting platform 104 may provide an instruction to development project database 108 to cause a development project database 108 to instantiate a configuration. For example, blueprinting platform 104 may create a new configuration for a software development project for which a blueprint is to be generated. In this case, blueprinting platform 104 may cause resources to be allocated for a software development project, such as memory resources to store a package that blueprinting platform 104 is to generate, processing resources to execute test scripts that blueprinting platform 104 is to generate, and/or the like.

As further shown in FIG. 1B, and by reference number 160, blueprinting platform 104 may receive information identifying a configuration version based on development project database 108 instantiating the configuration. For example, blueprinting platform 104 may receive information identifying a data structure entry created for the development project and associated with a particular version of the development project. In this case, blueprinting platform 104 may use the information identifying the data structure entry to subsequently obtain and/or create information regarding data entries associated with a configuration version.

Figure 1C:
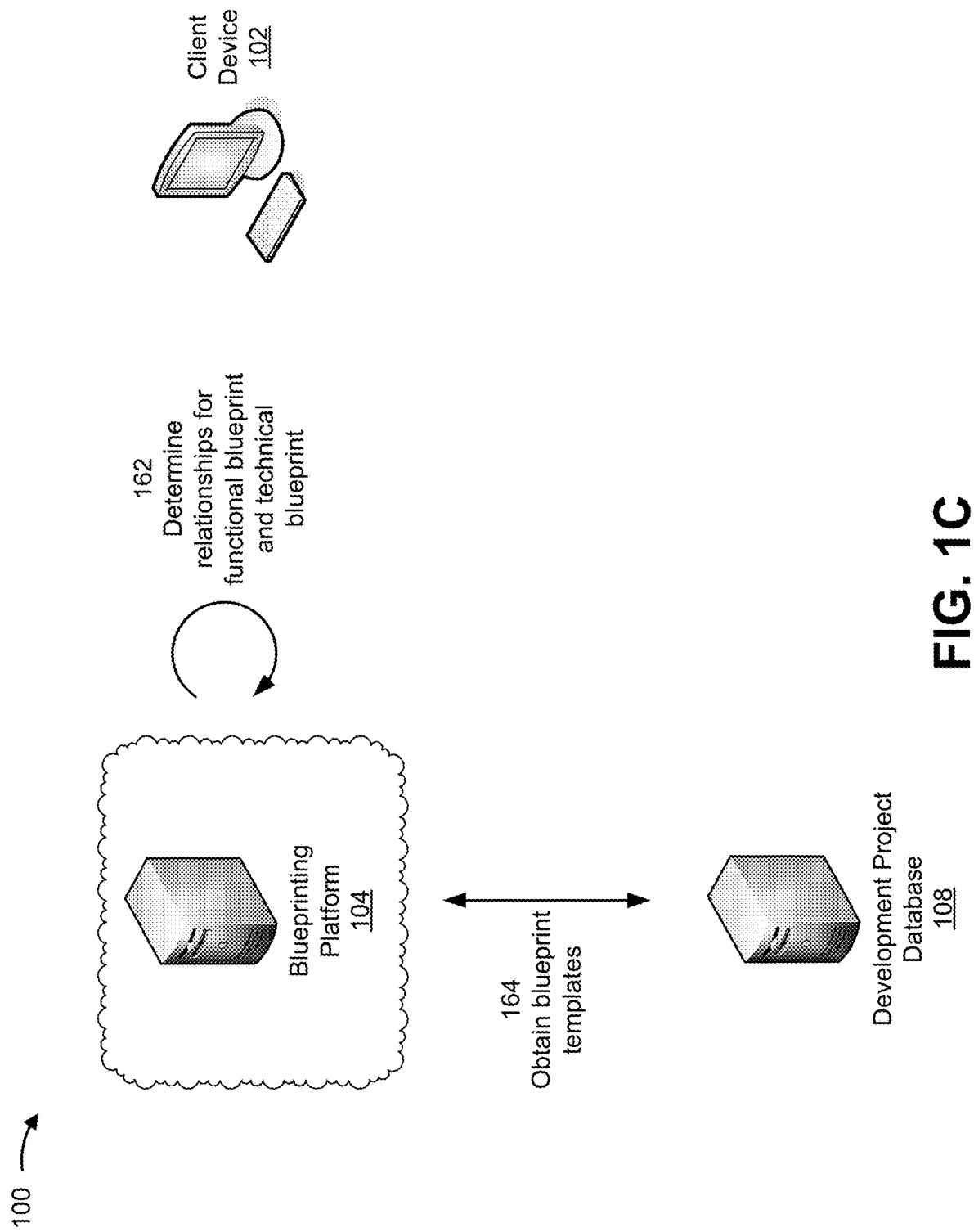

As shown in FIG. 1C, and by reference number 162, blueprinting platform 104 may determine relationships for a functional blueprint and/or a technical blueprint. For example, blueprinting platform 104 may determine a set of inputs, a set of outputs, a set of links, and/or the like for each component of a software development project. In this way, blueprinting platform 104 may generate a functional blueprint or a technical blueprint to represent the set of inputs, the set of outputs, the set of links, and/or the like. A blueprint may represent a set of data flows associated with the set of inputs, the set of outputs, the set of links, and/or the like. A technical blueprint may add protocol information, port information, authentication type information, and/or the like to flows represented in the functional blueprint. Further, a blueprint may represent a complete architecture of data flow from external components to internal components, such as in connection with an integration procedure. In this case, the blueprint may include information identifying connectors, enterprise service busses, platforms, event and notification services, automation services, and/or the like. Further, the blueprint may represent an environment in which each component is hosted, such as a platform, a client environment, a cloud environment, and/or the like.

In some implementations, blueprinting platform 104 may determine inter-component interactions. For example, blueprinting platform 104 may determine provisioning requests between modules of the development project, incident reporting that is to occur between modules of the development project, measurements and metrics that are to be exchanged between modules of the development project, and/or the like. In some implementations, blueprinting platform 104 may determine information relating to one or more tools for integration into a software development project. For example, blueprinting platform 104 may determine, based on information stored in the data structure entry created for the development project, a direction of data flow, an order of display, a source connection, a destination connection, a connection characteristic, and/or the like for each tool of the software development project and/or each relationship associated therewith.

In some implementations, blueprinting platform 104 may determine relationships between external tools and platform tools. For example, blueprinting platform 104 may use an automatic tool integration function to determine a set of data flows between a tool operating externally to a cloud computing environment of the software development project to a tool provided by the cloud computing environment of the software development project. In this way, blueprinting platform 104 may determine data flows for new external tools of which blueprinting platform 104 lacks a priori knowledge, and enables blueprinting for the new external tools. In some implementations, blueprinting platform 104 may execute an external tool in a sandbox environment to identify data flows for the external tool, inputs and outputs of the external tool, data formats of the external tool, and/or the like.

In some implementations, blueprinting platform 104 may perform format mapping. For example, blueprinting platform 104 may determine a first format of data input and output associated with one or more tools, and may determine a second format associated with a canonical data model for artificial intelligence processing in a cloud computing environment. In this case, blueprinting platform 104 may determine a mapping of source fields and target fields of data flows associated with the data input and output to convert between the first format and the second format. In this case, as described in more detail herein, blueprinting platform 104 may provide, in a blueprint, information identifying data conversions that are to be performed, and may, in a package, automatically generate code for performing the data conversion. In this way, blueprinting platform 104 reduces data format errors associated with using multiple different tools with multiple different data formats in a single software development project.

As further shown in FIG. 1C, and by reference number 164, blueprinting platform 104 may communicate with development project database 108 to obtain blueprint templates for generating the functional blueprint and/or the technical blueprint. For example, blueprinting platform 104 may obtain information identifying a template for generating a blueprint. In some implementations, the template may be associated with a particular software type, a particular development process (e.g., agile development, waterfall development, etc.), a particular organization, and/or the like. Based on using, for example, development process specific templates, blueprinting platform 104 reduces a utilization of processing resources associated with generating a blueprint relative to generating a blueprint without a template or customizing a generic template that is not, for example, development process specific.

Figure 1D:
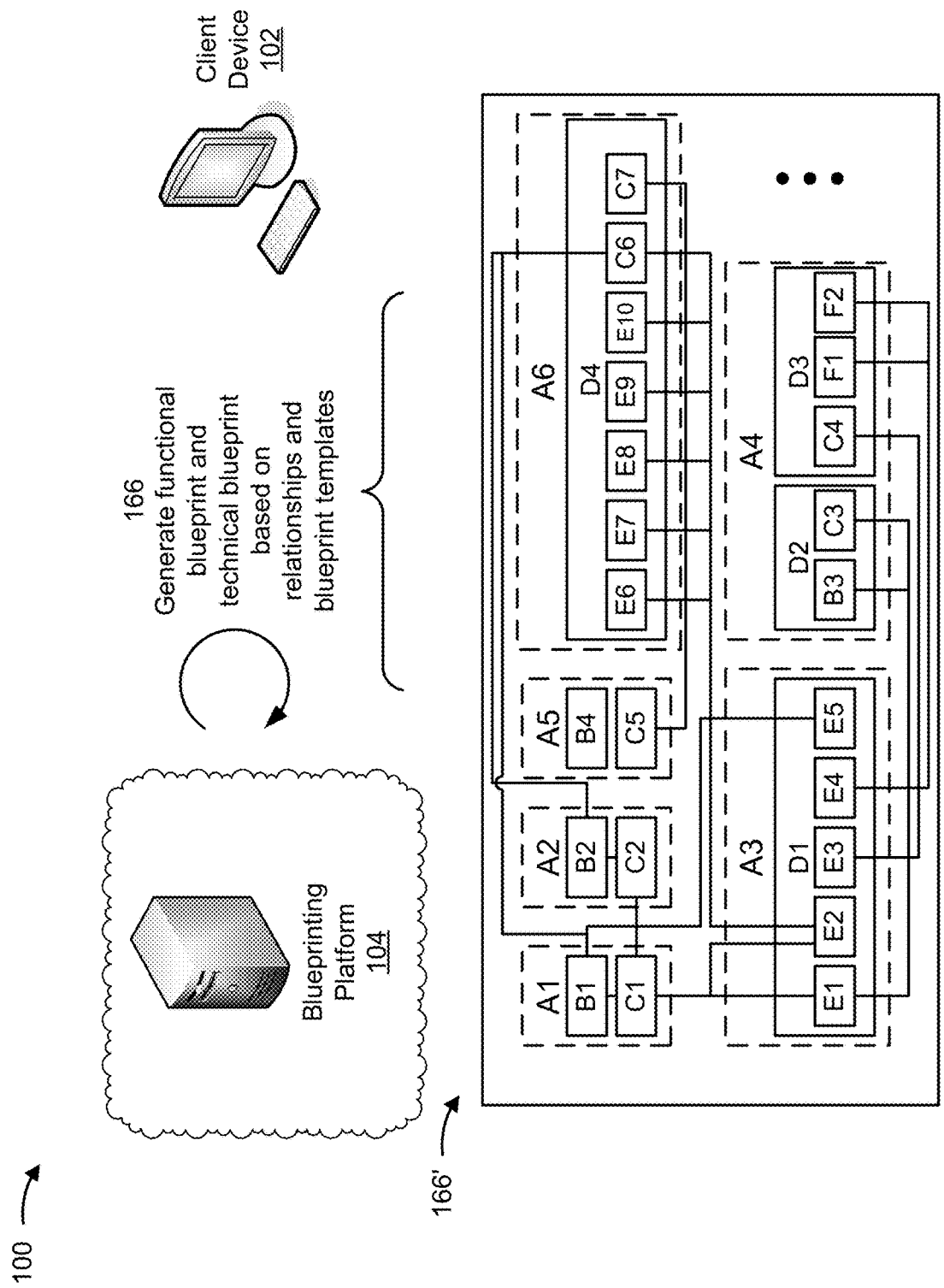

As shown in FIG. 1D, and by reference number 166, blueprinting platform 104 may generate a functional blueprint and/or a technical blueprint based on the relationships and the blueprint templates. For example, blueprinting platform 104 may automatically generate a functional blueprint, a technical blueprint, and/or the like to represent the relationships and based on the blueprint templates. In some implementations, blueprinting platform 104 may represent different tools in a blueprint. For example, blueprinting platform 104 may identify one or more tools for integration into the development project, and may represent the one or more tools in the development project. In this case, blueprinting platform 104 may represent a direction of data flow, an order of display, a source connection, a destination connection, a connection characteristic, and/or the like for the one or more tools. In some implementations, a blueprint may include a user interface grid. For example, for data format mapping between a first format of a canonical data model and a second format of an external tool, blueprinting platform 104 may generate a user interface grid identifying the mapping of source fields and target fields of each entity of the canonical data model and in the first format to a corresponding second format.

As further shown in FIG. 1D, and by reference number 166', a blueprint may include a representation of different components, linkages, and hierarchical relationships. For example, a component A1 includes a component B1 and a component C1 as hierarchically inferior components. As a further example, component B1 may link to a component E2, which is a subcomponent of a component D1 (which is a subcomponent of a component A3). Similarly, each component E6-E10 of component D4 (of component A6) may link to component E2. In this case, each link may represent a data flow between components. For example, A1 may represent a data center, B1 may represent an external tool of the data center, and C1 may represent a gateway of the data center. Similarly, A3 may represent an Amazon cloud, D1 may represent an enterprise Splunk instance, and E1 may represent an application of the enterprise Splunk instance. And, similarly, A6 may represent an Azure cloud, D4 may represent an application repository of the Azure cloud, and E6-E10 may represent individual applications of the application repository. In this way, blueprinting platform 104 may represent hierarchical relationships in data paths, code, and/or the like when performing package generation. Although a particular blueprint is shown, other types of blueprints, connections, layouts, and/or the like may be possible.

Figure 1E:
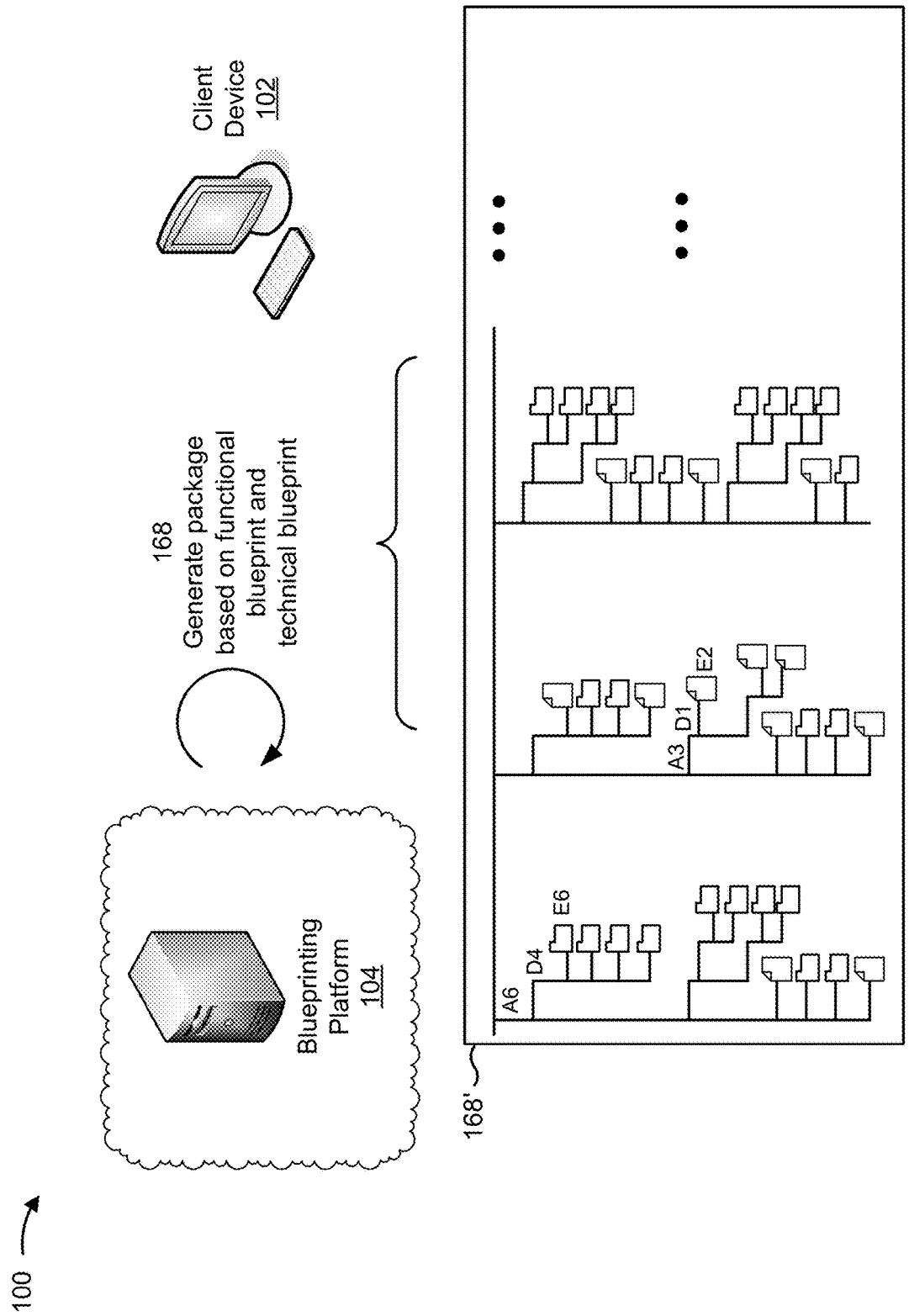

As shown in FIG. 1E, and by reference number 168, blueprinting platform 104 may generate a package based on the functional blueprint and/or the technical blueprint. For example, blueprinting platform 104, as shown by reference number 168' may generate a set of artifacts for the software development project represented by the functional blueprint and/or the technical blueprint, and may arrange the set of artifacts in a hierarchy that is arranged based on the functional blueprint, the technical blueprint, and/or the like (e.g., E6 may be hierarchically inferior to D4 and A6, as described above, and may include code for accessing, for example, E2, as described above. In this case, the set of artifacts may include a tool gateway configuration, a set of mapped extensible stylesheet documents (e.g., extensible stylesheet language transformation (XSLT) files) and object files (e.g., JavaScript Object Notation (JSON) files), and/or the like. In some implementations, blueprinting platform 104 may generate the package based on a predefined package template. For example, blueprinting platform 104 may access predefined templates for configuration files, mapping XSLT files, and/or the like, and may automatically fill fields of the predefined templates based on relationships of the functional blueprint and/or the technical blueprint to customize the predefined templates for the software development project.

Additionally, or alternatively, blueprinting platform 104 may use tool-specific package templates to generate folders, files, etc. for each tool that is to be integrated into a software development project. In some implementations, blueprinting platform 104 may generate unique identifiers for each folder, file, process pipeline, configuration file subsection, and/or the like. In some implementations, blueprinting platform 104 may generate a template file for the software development project with information included in the template file to associate the template file with one or more tools. For example, blueprinting platform 104 may generate section headers for the template file with unique identifiers generated for tools, folders, files, etc. automatically included in the section headers. In some implementations, blueprinting platform 104 may generate the template file based on a characteristic of the software development project, such as based on whether agile development or agile delivery is being used, whether the project is for service management, and/or the like. In this case, blueprinting platform 104 may save the template file as, for example, a mapping XSLT file. Further, blueprinting platform 104 may create a folder structure, and may save binaries, configuration files, and mapping XSLT files in the folder structure and with a set of paths selected based on a relationship of the binaries, configuration files, mapping XSLT files, and/or the like.

In some implementations, blueprinting platform 104 may generate code. For example, blueprinting platform 104 may generate code headers, code stubs, code documentation, functional code (e.g., based on code examples, a repository of code functions, and/or the like), and/or the like. In this case, blueprinting platform 104 may match tools that are to be integrated into a software development project with code for the tools in a code repository, and may automatically insert the code at a hierarchically-defined location based on the functional blueprint and/or the technical blueprint. In this way, blueprinting platform 104 improves code generation by accurately inserting automatically generated code into a hierarchically-defined location, thereby reducing a utilization processing and/or memory resources associated with editing code, refactoring code, and/or the like to accommodate hierarchies in the software development project that are identified after code generation.

In some implementations, blueprinting platform 104 may generate a code repository. For example, blueprinting platform 104 may collect code that is associated with tools for insertion into the software development project as a code repository, and may include the code repository in the package. In this way, blueprinting platform 104 reduces a utilization of memory relative to including all possible code repositories in the package and a utilization of network resources associated with a user repeatedly manually accessing needed code repositories that are not included in the package.

In some implementations, blueprinting platform 104 may map one or more objects of the package to an enterprise service bus. For example, blueprinting platform 104 may identify an enterprise service bus in the functional blueprint and/or the technical blueprint, and may generate a script for the one or more objects based on mapping the one or more objects to the enterprise service bus. In this case, the script may relate to enabling the one or more objects to access functionalities of the enterprise service bus. In some implementations, blueprinting platform 104 may establish one or more test scripts for the software development project. For example, based on the functional blueprint and/or the technical blueprint, blueprinting platform 104 may generate a test script to test that data flows of the software development project correspond to intended data flows represented in the functional blueprint and/or the technical blueprint. In some implementations, blueprinting platform 104 may execute the test script to validate that code of the software development project (e.g., automatically generated code, user generated code, and/or the like) matches the functional blueprint, the technical blueprint, and/or the like.

Figure 1F:
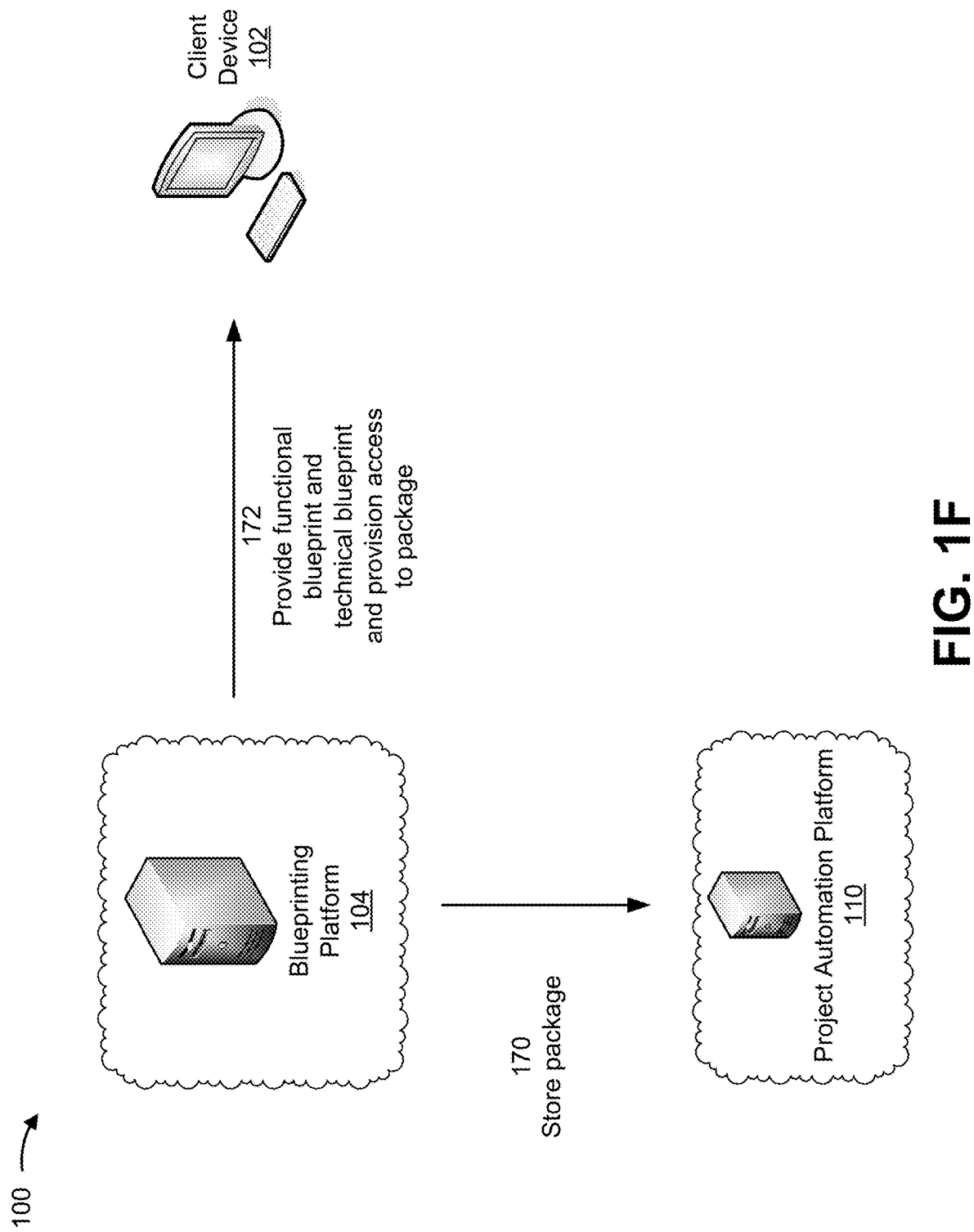

As shown in FIG. 1F, and by reference number 170, blueprinting platform 104 may store the package (e.g., in a data structure of a project automation platform 110 for use in automatic management and/or completion of the software development project by project automation platform 110). For example, blueprinting platform 104 may store the package in a cloud computing environment for access by software developers operating from different locations. In some implementations, blueprinting platform 104 may store the package for subsequent update. For example, when blueprinting platform 104 determines a change to an input, an output, a link, and/or the like associated with a tool integrated into the software development platform (e.g., based on detecting an update to the tool or a change to the tool), blueprinting platform 104 may update the functional blueprint and/or the technical blueprint, obtain the stored package, and update the stored package based on the update to the functional blueprint and/or the technical blueprint.

As further shown in FIG. 1F, and by reference number 172, blueprinting platform 104 may provide, to client device 102 for user access, the functional blueprint and/or the technical blueprint, and may provision access to the package. For example, blueprinting platform 104 may provide the functional blueprint and/or the technical blueprint for display. In some implementations, blueprinting platform 104 may provision the package in a particular environment. For example, blueprinting platform 104 may provision the package in a staging environment, and may automatically perform testing on the package before deploying the package outside of the staging environment (e.g., in a production environment). In this way, blueprinting platform 104 reduces a security risk, a risk of errors, and/or the like relative to deploying the package automatically in a production environment. In some implementations, blueprinting platform 104 may trigger user testing on the package in the staging environment. For example, blueprinting platform 104 may trigger alerts, may schedule time for testing engineers to perform testing (e.g., by communicating with client devices used to by the testing engineers to create and store calendar entries in the client devices), and/or the like. In some implementations, blueprinting platform 104 may provide output identifying results of automated testing. For example, based on executing a test script of a set of test cases for the package, blueprinting platform 104 may provide results of executing the test script to a set of stakeholders for review.

Additionally, or alternatively, blueprinting platform 104 may establish authentication of access to the package to enable authorized users to use the package to complete the software development project. Additionally, or alternatively, blueprinting platform 104 may provide the package for use in another computing environment (e.g., a non-cloud computing environment, a different cloud computing environment, and/or the like). In some implementations, blueprinting platform 104 may provide a set of binaries and/or configuration files. For example, blueprinting platform 104 may provide a folder with the set of binaries and/or configuration files assigned to paths determined based on the blueprint.

In some implementations, blueprinting platform 104 may generate code for the software development project, and may provide the code. For example, using the functional blueprint, the technical blueprint, and/or the like, blueprinting platform 104 may generate code, such as code headers, code stubs, code documentation, functional code (e.g., based on code examples, a repository of code functions, and/or the like), and may provide the code based on generating the code.

In this way, blueprinting platform 104 enables generation of blueprints, tool gateway scripts (e.g., a tool gateway configuration, a tool gateway installer, and/or the like), mapping JSON files, enterprise service bus configuration scripts, and/or the like based on automated analysis of tools for integration into a software development project.

As indicated above, FIGS. 1A-1F are provided merely as one or more examples. Other examples may differ from what is described with regard to FIGS. 1A-1F.

Figure 2:
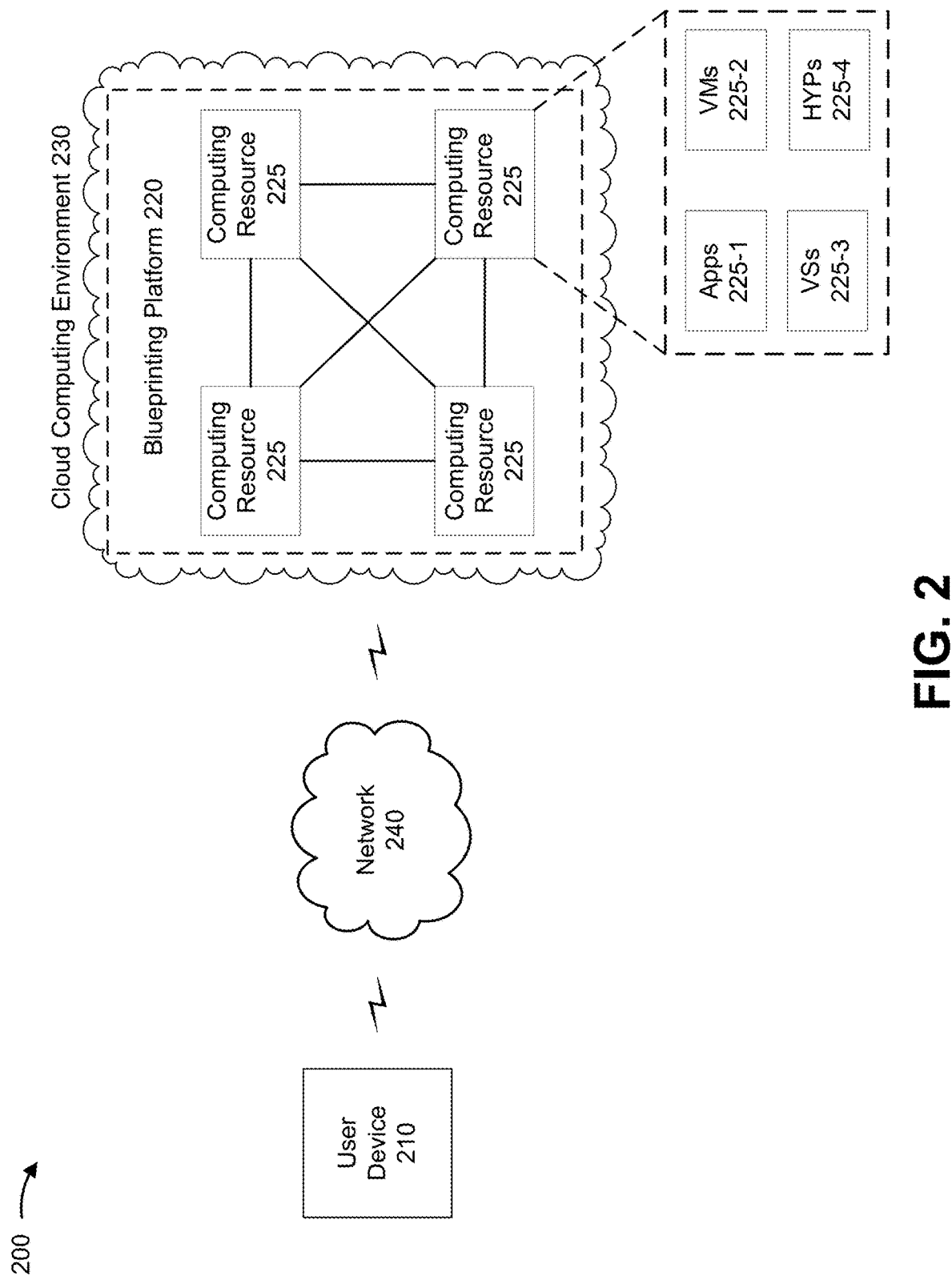
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a user device 210, a blueprinting platform 220, a computing resource 225, a cloud computing resource 230, and a network 240. Devices of environment 200 may interconnect via wired connections, wireless connections, or a combination of wired and wireless connections.

User device 210 includes one or more devices capable of receiving, generating, storing, processing, and/or providing information associated with development project blueprint and package generation. For example, user device 210 may include a communication and/or computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device.

Blueprinting platform 220 includes one or more computing resources assigned to generate a blueprint and/or generate a package. For example, blueprinting platform 220 may be a platform implemented by cloud computing environment 230 that may generate a blueprint and/or generate a package. In some implementations, blueprinting platform 220 is implemented by computing resources 225 of cloud computing environment 230.

Blueprinting platform 220 may include a server device or a group of server devices. In some implementations, blueprinting platform 220 may be hosted in cloud computing environment 230. Notably, while implementations described herein describe blueprinting platform 220 as being hosted in cloud computing environment 230, in some implementations, blueprinting platform 220 may be non-cloud-based or may be partially cloud-based.

Cloud computing environment 230 includes an environment that delivers computing as a service, whereby shared resources, services, etc. may be provided to user device 210, blueprinting platform 220, and/or the like. Cloud computing environment 230 may provide computation, software, data access, storage, and/or other services that do not require end-user knowledge of a physical location and configuration of a system and/or a device that delivers the services. As shown, cloud computing environment 230 may include blueprinting platform 220 and computing resource 225.

Computing resource 225 includes one or more personal computers, workstation computers, server devices, or another type of computation and/or communication device. In some implementations, computing resource 225 may host blueprinting platform 220. The cloud resources may include compute instances executing in computing resource 225, storage devices provided in computing resource 225, data transfer devices provided by computing resource 225, etc. In some implementations, computing resource 225 may communicate with other computing resources 225 via wired connections, wireless connections, or a combination of wired and wireless connections.

As further shown in FIG. 2, computing resource 225 may include a group of cloud resources, such as one or more applications ("APPs") 225-1, one or more virtual machines ("VMs") 225-2, virtualized storage ("VSs") 225-3, one or more hypervisors ("HYPs") 225-4, or the like.

Application 225-1 includes one or more software applications that may be provided to or accessed by user device 210. Application 225-1 may eliminate a need to install and execute the software applications on user device 210. For example, application 225-1 may include software associated with blueprinting platform 220 and/or any other software capable of being provided via cloud computing environment 230. In some implementations, one application 225-1 may send/receive information to/from one or more other applications 225-1, via virtual machine 225-2.

Virtual machine 225-2 includes a software implementation of a machine (e.g., a computer) that executes programs like a physical machine. Virtual machine 225-2 may be either a system virtual machine or a process virtual machine, depending upon use and degree of correspondence to any real machine by virtual machine 225-2. A system virtual machine may provide a complete system platform that supports execution of a complete operating system ("OS"). A process virtual machine may execute a single program and may support a single process. In some implementations, virtual machine 225-2 may execute on behalf of a user (e.g., user device 210), and may manage infrastructure of cloud computing environment 230, such as data management, synchronization, or long-duration data transfers.

Virtualized storage 225-3 includes one or more storage systems and/or one or more devices that use virtualization techniques within the storage systems or devices of computing resource 225. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 225-4 provides hardware virtualization techniques that allow multiple operating systems (e.g., "guest operating systems") to execute concurrently on a host computer, such as computing resource 225. Hypervisor 225-4 may present a virtual operating platform to the guest operating systems and may manage the execution of the guest operating systems. Multiple instances of a variety of operating systems may share virtualized hardware resources.

The number and arrangement of devices and networks shown in FIG. 2 are provided as one or more examples. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
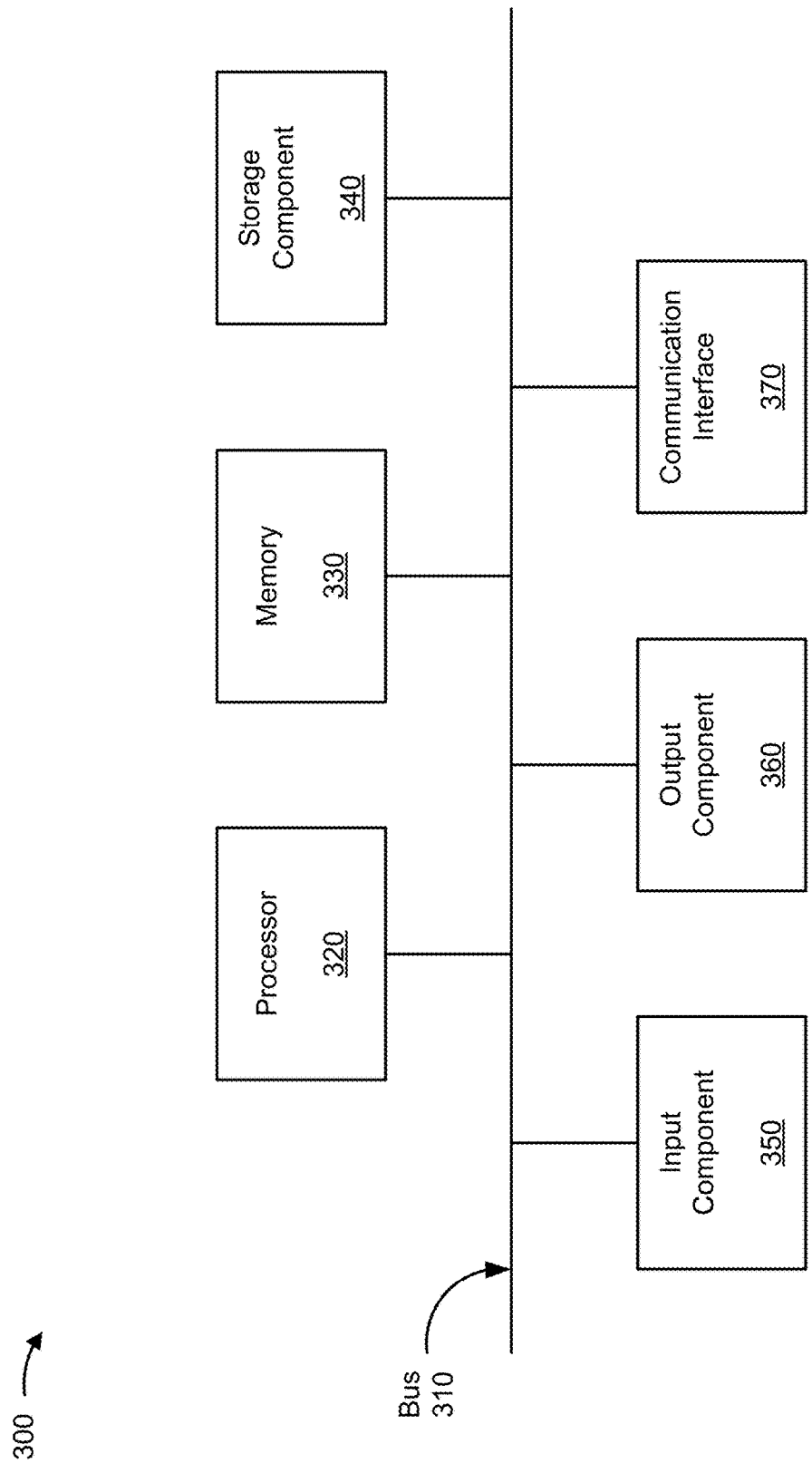
FIG. 3 is a diagram of example components of one or more devices of FIG. 2.

FIG. 3 is a diagram of example components of a device 300. Device 300 may correspond to user device 210, blueprinting platform 220, and/or computing resource 225. In some implementations, user device 210, blueprinting platform 220, and/or computing resource 225 may include one or more devices 300 and/or one or more components of device 300. As shown in FIG. 3, device 300 may include a bus 310, a processor 320, a memory 330, a storage component 340, an input component 350, an output component 360, and/or a communication interface 370.

Bus 310 includes a component that permits communication among multiple components of device 300. Processor 320 is implemented in hardware, firmware, and/or a combination of hardware and software. Processor 320 takes the form of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a component for determining location (e.g., a global positioning system (GPS) component) and/or a sensor (e.g., an accelerometer, a gyroscope, an actuator, another type of positional or environmental sensor, and/or the like). Output component 360 includes a component that provides output information from device 300 (via, e.g., a display, a speaker, a haptic feedback component, an audio or visual indicator, and/or the like).

Communication interface 370 includes a transceiver-like component (e.g., a transceiver, a separate receiver, a separate transmitter, and/or the like) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. As used herein, the term "computer-readable medium" refers to a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
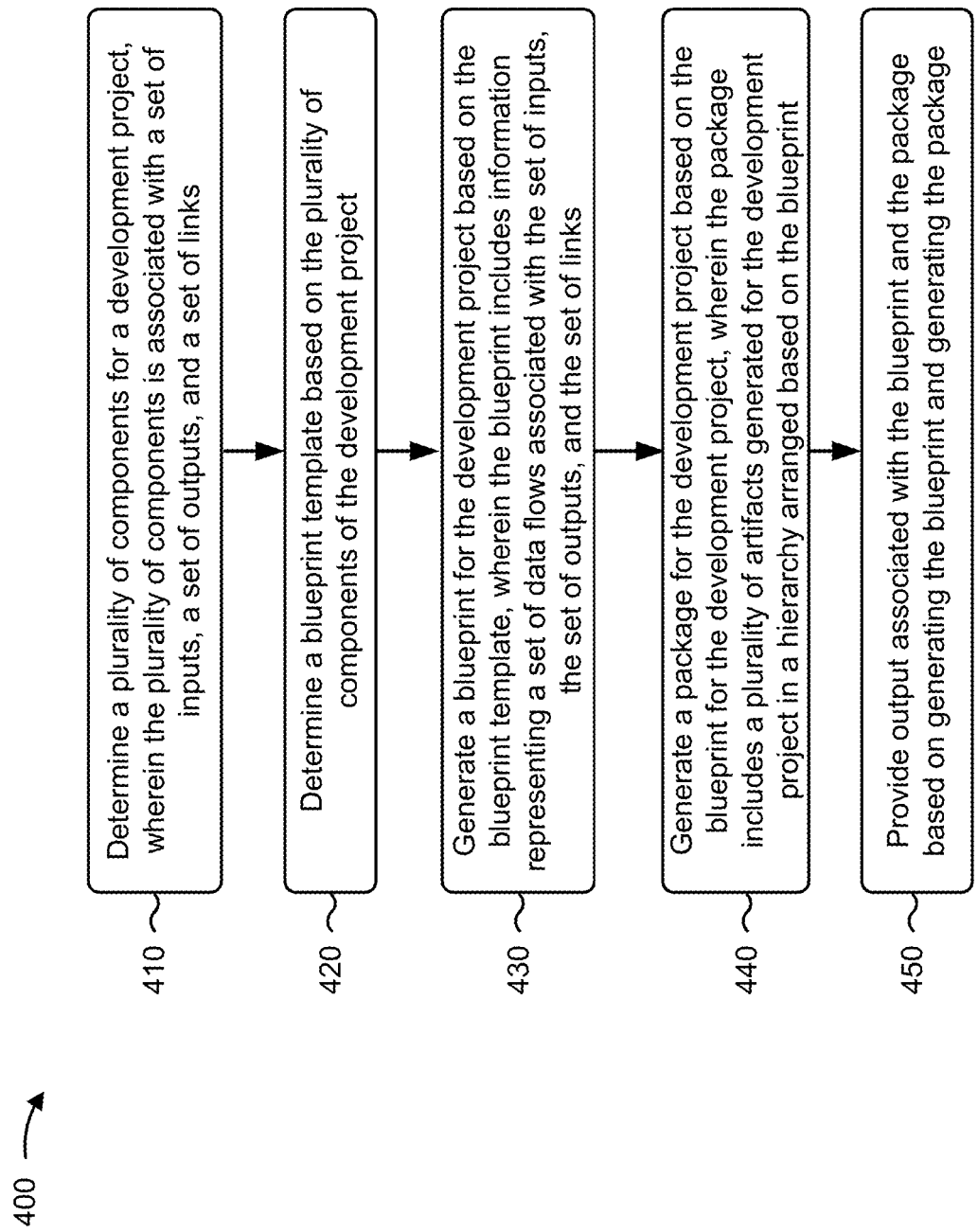

FIG. 4 is a flow chart of an example process 400 for development project blueprint and package generation. In some implementations, one or more process blocks of FIG. 4 may be performed by a blueprinting platform (e.g., blueprinting platform 220). In some implementations, one or more process blocks of FIG. 4 may be performed by another device or a group of devices separate from or including the blueprinting platform, such as a user device (e.g., user device 210), a computing resource (e.g., computing resource 225), and/or the like.

As shown in FIG. 4, process 400 may include determining a plurality of components for a development project wherein the plurality of components is associated with a set of inputs, a set of outputs, and a set of links (block 410). For example, the blueprinting platform (e.g., using processor 320, memory 330, storage component 340, input component 350, output component 360, communication interface 370 and/or the like) may determine a plurality of components for a development project and wherein the plurality of components is associated with a set of inputs, a set of outputs, and a set of links, as described above. In some implementations, the plurality of components is associated with a set of inputs, a set of outputs, and a set of links.

As further shown in FIG. 4, process 400 may include determining a blueprint template based on the plurality of components of the development project (block 420). For example, the blueprinting platform (e.g., using processor 320, memory 330, storage component 340, input component 350, output component 360, communication interface 370 and/or the like) may determine a blueprint template based on the plurality of components of the development project, as described above.

As further shown in FIG. 4, process 400 may include generating a blueprint for the development project based on the blueprint template wherein the blueprint includes information representing a set of data flows associated with the set of inputs, the set of outputs, and the set of links (block 430). For example, the blueprinting platform (e.g., using processor 320, memory 330, storage component 340, input component 350, output component 360, communication interface 370 and/or the like) may generate a blueprint for the development project based on the blueprint template and wherein the blueprint includes information representing a set of data flows associated with the set of inputs, the set of outputs, and the set of links, as described above. In some implementations, the blueprint includes information representing a set of data flows associated with the set of inputs, the set of outputs, and the set of links.

As further shown in FIG. 4, process 400 may include generating a package for the development project based on the blueprint for the development project wherein the package includes a plurality of artifacts generated for the development project in a hierarchy arranged based on the blueprint (block 440). For example, the blueprinting platform (e.g., using processor 320, memory 330, storage component 340, input component 350, output component 360, communication interface 370 and/or the like) may generate a package for the development project based on the blueprint for the development project and wherein the package includes a plurality of artifacts generated for the development project in a hierarchy arranged based on the blueprint, as described above. In some implementations, the package includes a plurality of artifacts generated for the development project in a hierarchy arranged based on the blueprint.

As further shown in FIG. 4, process 400 may include providing output associated with the blueprint and the package based on generating the blueprint and generating the package (block 450). For example, the blueprinting platform (e.g., using processor 320, memory 330, storage component 340, input component 350, output component 360, communication interface 370 and/or the like) may provide output associated with the blueprint and the package based on generating the blueprint and generating the package, as described above.

Process 400 may include additional implementations, such as any single implementation or any combination of implementations described below and/or in connection with one or more other processes described elsewhere herein.

In some implementations, providing the output includes providing at least one of the package, the blueprint, or code for the development project generated based on the blueprint and the package. In some implementations, generating the package includes generating a set of folders in a folder structure determined based on the blueprint. In some implementations, generating the package includes generating a set of binaries and a set of configuration files assigned to a set of paths determined based on the blueprint.

In some implementations, generating the package includes obtaining a binary for the package from a tool repository and storing the binary in the package. In some implementations, generating the package includes generating one or more code repositories for the package based on the blueprint. In some implementations, the blueprinting platform may map one or more objects associated with the package to an enterprise service bus and generate a script for the one or more objects based on mapping the one or more objects to the enterprise service bus.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIG. 5 is a flow chart of an example process 500 for development project blueprint and package generation. In some implementations, one or more process blocks of FIG. 5 may be performed by a blueprinting platform (e.g., blueprinting platform 220). In some implementations, one or more process blocks of FIG. 5 may be performed by another device or a group of devices separate from or including the blueprinting platform, such as a user device (e.g., user device 210), a computing resource (e.g., computing resource 225), and/or the like.

As shown in FIG. 5, process 500 may include determining a set of inputs, a set of outputs, and a set of links for a development project (block 510). For example, the blueprinting platform (e.g., using processor 320, memory 330, storage component 340, input component 350, output component 360, communication interface 370 and/or the like) may determine a set of inputs, a set of outputs, and a set of links for a development project, as described above.

As further shown in FIG. 5, process 500 may include determining a blueprint template based on the set of inputs, the set of outputs, and the set of links of the development project (block 520). For example, the blueprinting platform (e.g., using processor 320, memory 330, storage component 340, input component 350, output component 360, communication interface 370 and/or the like) may determine a blueprint template based on the set of inputs, the set of outputs, and the set of links of the development project, as described above.

As further shown in FIG. 5, process 500 may include generating a blueprint for the development project based on the blueprint template wherein the blueprint includes information representing a set of data flows associated with the set of inputs, the set of outputs, and the set of links (block 530). For example, the blueprinting platform (e.g., using processor 320, memory 330, storage component 340, input component 350, output component 360, communication interface 370 and/or the like) may generate a blueprint for the development project based on the blueprint template and wherein the blueprint includes information representing a set of data flows associated with the set of inputs, the set of outputs, and the set of links, as described above. In some implementations, the blueprint includes information representing a set of data flows associated with the set of inputs, the set of outputs, and the set of links.

As further shown in FIG. 5, process 500 may include generating a package for the development project based on the blueprint for the development project wherein the package includes a plurality of artifacts generated for the development project in a hierarchy arranged based on the blueprint (block 540). For example, the blueprinting platform (e.g., using processor 320, memory 330, storage component 340, input component 350, output component 360, communication interface 370 and/or the like) may generate a package for the development project based on the blueprint for the development project and wherein the package includes a plurality of artifacts generated for the development project in a hierarchy arranged based on the blueprint, as described above. In some implementations, the package includes a plurality of artifacts generated for the development project in a hierarchy arranged based on the blueprint.

As further shown in FIG. 5, process 500 may include providing output associated with the blueprint and the package based on generating the blueprint and generating the package (block 550). For example, the blueprinting platform (e.g., using processor 320, memory 330, storage component 340, input component 350, output component 360, communication interface 370 and/or the like) may provide output associated with the blueprint and the package based on generating the blueprint and generating the package, as described above.

Process 500 may include additional implementations, such as any single implementation or any combination of implementations described below and/or in connection with one or more other processes described elsewhere herein.

In some implementations, the blueprint is a technical blueprint or a functional blueprint. In some implementations, generating the blueprint includes mapping external tools associated with the set of inputs, the set of outputs, and the set of links to platform tools associated with the set of inputs, the set of outputs, and the set of links. In some implementations, generating the blueprint includes mapping source fields and target fields of data flows associated with the set of inputs, the set of outputs, and the set of links to a canonical data model of a cloud platform for automated project management.

In some implementations, generating the package includes configuring a tool gateway deployment based on the blueprint. In some implementations, generating the package includes provisioning the development project in a cloud platform for automated project management based on the blueprint. In some implementations, generating the package includes establishing one or more test scripts for the development project based on the blueprint. In some implementations, the blueprinting platform may determine a change to at least one of the set of inputs, the set of outputs, or the set of links, update the blueprint based on the change, and update the package based on updating the blueprint.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

FIG. 6 is a flow chart of an example process 600 for development project blueprint and package generation. In some implementations, one or more process blocks of FIG. 6 may be performed by a blueprinting platform (e.g., blueprinting platform 220). In some implementations, one or more process blocks of FIG. 6 may be performed by another device or a group of devices separate from or including the blueprinting platform, such as a user device (e.g., user device 210), a computing resource (e.g., computing resource 225), and/or the like.

As shown in FIG. 6, process 600 may include determining a plurality of components for a development project wherein the plurality of components is associated with a set of inputs, a set of outputs, a set of links (block 610). For example, the blueprinting platform (e.g., using processor 320, memory 330, storage component 340, input component 350, output component 360, communication interface 370 and/or the like) may determine a plurality of components for a development project and wherein the plurality of components is associated with a set of inputs, a set of outputs, a set of links, as described above. In some implementations, the plurality of components is associated with a set of inputs, a set of outputs, a set of links.

As further shown in FIG. 6, process 600 may include determining a blueprint template based on the plurality of components of the development project (block 620). For example, the blueprinting platform (e.g., using processor 320, memory 330, storage component 340, input component 350, output component 360, communication interface 370 and/or the like) may determine a blueprint template based on the plurality of components of the development project, as described above.

As further shown in FIG. 6, process 600 may include generating a blueprint for the development project based on the blueprint template wherein the blueprint includes information representing a set of data flows associated with the set of inputs, the set of outputs, and the set of links (block 630). For example, the blueprinting platform (e.g., using processor 320, memory 330, storage component 340, input component 350, output component 360, communication interface 370 and/or the like) may generate a blueprint for the development project based on the blueprint template and wherein the blueprint includes information representing a set of data flows associated with the set of inputs, the set of outputs, and the set of links, as described above. In some implementations, the blueprint includes information representing a set of data flows associated with the set of inputs, the set of outputs, and the set of links.

As further shown in FIG. 6, process 600 may include generating a package for the development project based on the blueprint for the development project wherein the package includes a plurality of artifacts generated for the development project in a hierarchy arranged based on the blueprint (block 640). For example, the blueprinting platform (e.g., using processor 320, memory 330, storage component 340, input component 350, output component 360, communication interface 370 and/or the like) may generate a package for the development project based on the blueprint for the development project and wherein the package includes a plurality of artifacts generated for the development project in a hierarchy arranged based on the blueprint, as described above. In some implementations, the package includes a plurality of artifacts generated for the development project in a hierarchy arranged based on the blueprint.

As further shown in FIG. 6, process 600 may include providing output associated with the blueprint and the package based on generating the blueprint and generating the package (block 650). For example, the blueprinting platform (e.g., using processor 320, memory 330, storage component 340, input component 350, output component 360, communication interface 370 and/or the like) may provide output associated with the blueprint and the package based on generating the blueprint and generating the package, as described above.

Process 600 may include additional implementations, such as any single implementation or any combination of implementations described below and/or in connection with one or more other processes described elsewhere herein.

In some implementations, the blueprinting platform may generate a set of folders in a folder structure determined based on the blueprint. In some implementations, the blueprint template is selected based on a delivery type of the development project. In some implementations, the blueprinting platform may determine a plurality of linkages between a plurality of cloud computing environments associated with the plurality of components based on characteristics of the plurality of cloud computing environments, and may represent the plurality of linkages in the blueprint. In some implementations, the blueprinting platform may validate that program code of the development project matches the blueprint.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, and/or a combination of hardware and software.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Certain user interfaces have been described herein and/or shown in the figures. A user interface may include a graphical user interface, a non-graphical user interface, a text-based user interface, and/or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   determining, by a device, a plurality of components for a development project,
      wherein each of the plurality of components is associated with a corresponding set of inputs, a corresponding set of outputs, and a corresponding set of links;
   determining, by the device, a blueprint template based on the plurality of components of the development project;
   generating, by the device, a blueprint for the development project based on the blueprint template,
      wherein the blueprint includes:
         information representing each of the plurality of components,
         information representing, for each component of the plurality of components, a corresponding a set of data flows associated with one or more sources of the corresponding set of inputs for the component, one or more targets for the corresponding set of outputs for the component, and a direction associated with the corresponding set of links for the component, and
         information representing hierarchical relationships between the plurality of components;
   generating, by the device, a package for the development project based on the blueprint for the development project,
      wherein the package includes a plurality of artifacts generated for the development project in a hierarchy arranged based on the hierarchical relationships; and
   providing, by the device, output associated with the blueprint and the package based on generating the blueprint and generating the package.

2. The method of claim 1, wherein providing the output comprises:
   providing at least one of:
      the package,
      the blueprint, or
      code for the development project generated based on the blueprint and the package.

3. The method of claim 1, wherein generating the package comprises:
   generating a set of folders in a folder structure determined based on the blueprint.

4. The method of claim 1, wherein generating the package comprises:
   generating a set of binaries and a set of configuration files assigned to a set of paths determined based on the blueprint.

5. The method of claim 1, wherein generating the package comprises:
   obtaining a binary for the package from a tool repository; and
   storing the binary in the package.

6. The method of claim 1, wherein generating the package comprises:
generating one or more code repositories for the package based on the blueprint.

7. The method of claim 1, further comprising:
mapping one or more objects associated with the package to an enterprise service bus; and
generating a script for the one or more objects based on mapping the one or more objects to the enterprise service bus.

8. A device, comprising:
a memory; and
one or more processors operatively coupled to the memory, the one or more processors to:
determine a respective set of inputs, a respective set of outputs, and a respective set of links for each of a plurality of components for development project;
determine a blueprint template based on the respective set of inputs, the respective set of outputs, and the respective set of links of the development project;
generate a blueprint for the development project based on the blueprint template,
wherein the blueprint includes:
information representing the plurality of components,
information representing, for each of the plurality of components, a corresponding set of data flows associated with one or more sources of the respective set of inputs for the component, one or more targets for the respective set of outputs for the component, and a direction associated with the respective set of links for the component;
information representing hierarchical relationships between the plurality of components;
generate a package for the development project based on the blueprint for the development project,
wherein the package includes a plurality of artifacts generated for the development project in a hierarchy arranged based on the hierarchical relationships; and
provide output associated with the blueprint and the package based on generating the blueprint and generating the package.

9. The device of claim 8, wherein the blueprint is a technical blueprint or a functional blueprint.

10. The device of claim 8, wherein the one or more processors, when generating the blueprint, are to:
map external tools associated with the respective set of inputs, the respective set of outputs, and the respective set of links to platform tools associated with the respective set of inputs, the respective set of outputs, and the respective set of links.

11. The device of claim 8, wherein the one or more processors, when generating the blueprint, are to:
map source fields and target fields of data flows associated with the respective set of inputs, the respective set of outputs, and the respective set of links to a canonical data model of a cloud platform for automated project management.

12. The device of claim 8, wherein the one or more processors, when generating the package, are to:
configure a tool gateway deployment based on the blueprint.

13. The device of claim 8, wherein the one or more processors, when generating the package, are to:
provision the development project in a cloud platform for automated project management based on the blueprint.

14. The device of claim 8, wherein the one or more processors, when generating the package, are to:
establish one or more test scripts for the development project based on the blueprint.

15. The device of claim 8, wherein the one or more processors are further to:
determine a change to at least one of the respective set of inputs, the respective set of outputs, or the respective set of links;
update the blueprint based on the change; and
update the package based on updating the blueprint.

16. A non-transitory computer-readable medium storing one or more instructions, comprising:
one or more instructions that, when executed by one or more processors of a device, cause the one or more processors to:
determine a plurality of components for a development project,
wherein each of the plurality of components is associated with a corresponding set of inputs, a corresponding set of outputs, and a corresponding set of links;
determine a blueprint template based on the plurality of components of the development project;
generate a blueprint for the development project based on the blueprint template,
wherein the blueprint includes:
information representing each of the plurality of components,
information representing, for each component of the plurality of components, a corresponding a set of data flows associated with one or more sources of the corresponding set of inputs for the component, one or more targets for the corresponding set of outputs for the component, and a direction associated with the corresponding set of links for the component, and
information representing hierarchical relationships between the plurality of components;
generate a package for the development project based on the blueprint for the development project,
wherein the package includes a plurality of artifacts generated for the development project in a hierarchy arranged based on the hierarchical relationships; and
provide output associated with the blueprint and the package based on generating the blueprint and generating the package.

17. The non-transitory computer-readable medium of claim 16, wherein the one or more instructions, that cause the one or more processors to generate the package, cause the one or more processors to:
generate a set of folders in a folder structure determined based on the blueprint.

18. The non-transitory computer-readable medium of claim 16, wherein the blueprint template is selected based on a delivery type of the development project.

19. The non-transitory computer-readable medium of claim 16, wherein the one or more instructions, when executed by the one or more processors, further cause the one or more processors to:
determine a plurality of linkages between a plurality of cloud computing environments associated with the plurality of components based on characteristics of the plurality of cloud computing environments; and
represent the plurality of linkages in the blueprint.

20. The non-transitory computer-readable medium of claim 16, wherein the one or more instructions, when executed by the one or more processors, further cause the one or more processors to:
validate that program code of the development project matches the blueprint.

* * * * *